United States Patent
Wynn

[11] Patent Number: 6,118,827
[45] Date of Patent: Sep. 12, 2000

[54] APPARATUS FOR PROVIDING INCREASED DATA RATES WITHIN EXISTING MODULATION SYSTEMS

[75] Inventor: Stephen R. Wynn, Lynchburg, Va.

[73] Assignee: Ericsson Inc., Research Triangle Park, N.C.

[21] Appl. No.: 08/924,165

[22] Filed: Sep. 5, 1997

[51] Int. Cl.$^7$ .................................................. H04L 27/10
[52] U.S. Cl. .................... 375/273; 375/283; 375/308; 375/331
[58] Field of Search ................................ 375/331, 330, 375/308, 283, 273, 216

[56] References Cited

U.S. PATENT DOCUMENTS

| | | | |
|---|---|---|---|
| 3,924,186 | 12/1975 | Gordy et al. | 325/30 |
| 4,562,415 | 12/1985 | McBiles | 332/9 R |
| 4,841,547 | 6/1989 | Ikegami et al. | 375/53 |
| 5,140,613 | 8/1992 | Birgenheier et al. | 375/67 |
| 5,157,693 | 10/1992 | Lemersal, Jr. et al. | 375/54 |
| 5,377,229 | 12/1994 | Wilson et al. | 375/9 |
| 5,600,677 | 2/1997 | Citta et al. | 375/296 |
| 5,604,770 | 2/1997 | Fetz | 375/296 |
| 5,757,245 | 5/1998 | Song | 332/100 |
| 5,822,704 | 10/1998 | Ishii | 455/553 |

FOREIGN PATENT DOCUMENTS

| | | |
|---|---|---|
| 0 252 589 A2 | 1/1988 | European Pat. Off. . |
| 0 617 531 A1 | 9/1994 | European Pat. Off. . |
| 6-291795 | 10/1994 | Japan . |

OTHER PUBLICATIONS

N. Seshadri, et al. Multi–Level Block Coded Modulations with Unequal Error Protection for the Rayleigh Fading Channel, European Transactions on Telecommunications and Related Technologies, vol. 4, No. 3, May 1, 1993, pp. 325–334, XP000385758.

*Primary Examiner*—Stephen Chin
*Assistant Examiner*—Dac V. Ha
*Attorney, Agent, or Firm*—Jenkens & Gilchrist, P.C.

[57] ABSTRACT

A method for increasing data rates within a modulated signal is disclosed. Initially, a first and second bit streams are interleaved together to form an interleaved output bit stream. The interleaved output bit stream is modulated in a manner such that upon demodulation of the interleaved output bit stream according to an FSK modulation scheme only the first bit stream is recovered, and upon demodulation of the interleaved output bit stream according to a second modulation scheme, both the first and second bit streams are recovered.

11 Claims, 3 Drawing Sheets

APPARATUS FOR PROVIDING INCREASED DATA RATES WITHIN EXISTING MODULATION SYSTEMS

BACKGROUND OF THE INVENTION

1. Technical Field of the Invention

The present invention relates to modulation systems, and more particularly, to a modulation system providing increased data rates that is backward compatible with existing FSK modulation systems.

2. Description of Related Art

The two level NRZ (Non-Return to Zero) frequency shift key (FSK) modulation technique used by some control channels within mobile radio communication systems is well defined, and many existing mobile radio products have been manufactured and sold that recognize this modulation and messaging protocol. However, as the demand for mobile radio communication services increase, and the variety of available functionalities associated with these services increase, existing systems are experiencing a problem with the group and/or logical IDs that are possible within the bit structure of existing systems. The capabilities and range of existing systems have been temporarily extended by utilizing bit stealing techniques within the broadcast channel (BCH) codes or other similar techniques. However, a more permanent solution requires an increase in the number of bits provided by the modulation scheme.

In order to preserve existing hardware infrastructure, it is highly desirable that any new system providing increased bits (data rates) should not affect the existing product base of mobile radio communications gear. Changes may occur within system level units, such as, the base station infrastructure. However, the mobile radio terminals must preferably remain unchanged.

One modulation technique known as $\pi/2$-DBPSK (differential binary phase shift key) has been proposed for use within a narrowband (12.5 kHz) system that provides an improved spectrum over a reduced deviation FSK technique. The $\pi/2$-DBPSK technique involves sending phase changes much like a $\pi/4$-DQPSK (differential quadrature phase shift key) except that only one bit is encoded at a time. For instance, a 0 represents a $\pi/2$ change in a positive direction and a 1 would represent a negative $\pi/2$ change in the negative direction. This generates a scatter diagram as shown in FIG. 1.

A two level FSK modulation technique performs basically the same function except that the phase transition is along a constant magnitude circle that the constellation represents. The $\pi/2$ modulation technique takes a more direct path which indicates that it has amplitude variation. The net difference on the receiving radio is that they possess slightly different eye patterns. The assumption is that if FSK and $\pi/2$-DBPSK both deviate by the same general amount, the frequency shift key receiver will not know the difference between the two, especially if the incoming signal is squared up relative to the zero crossing. The $\pi/2$-DBPSK system provides a spectrum and bit error rate improvement but does not increase the data rate of the channel. A system providing these improvements would be greatly desired.

SUMMARY OF THE INVENTION

The present invention overcomes the forgoing and other problems using an improved method and apparatus for increasing the data rates within a modulated signal. The process is begun by interleaving a primary and a secondary bit streams together to generate an interleaved output bit stream. The interleaved output bit stream is encoded using one of a plurality of encoding techniques such that decoding of the coded bit stream in a first manner yields only the primary bit stream. Decoding of the encoded bit stream in a second manner yields both the primary and the secondary bit streams. The encoded bit stream is then modulated using a modulation scheme compatible with the encoding scheme such that demodulation of the signal in a first manner yields only the encoded primary bit stream and demodulation in a second manner yields both the encoded primary and secondary bit streams. The encoding and modulation techniques may utilize various schemes such as $^m\pi/2$-DQPSK, and $\pi/2$-DQPSK or schemes utilizing multiple transitions for each bit pair.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
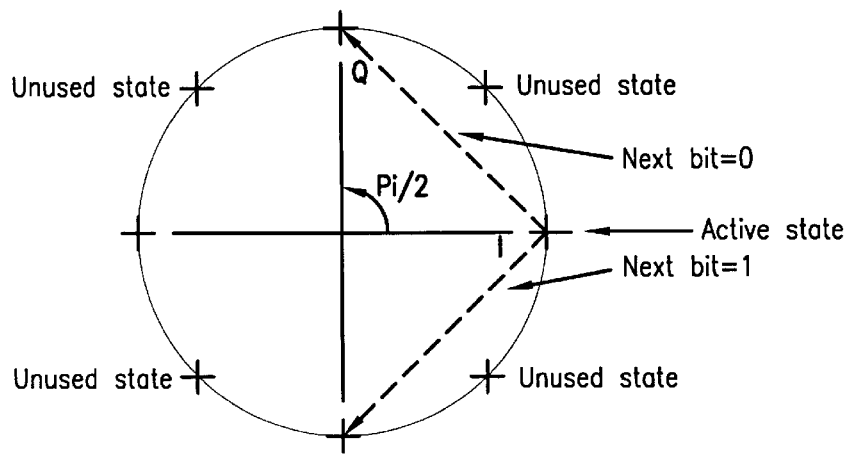
FIG. 1 is a scatter diagram of a prior art $\pi/2$ signal.
Figure 2:
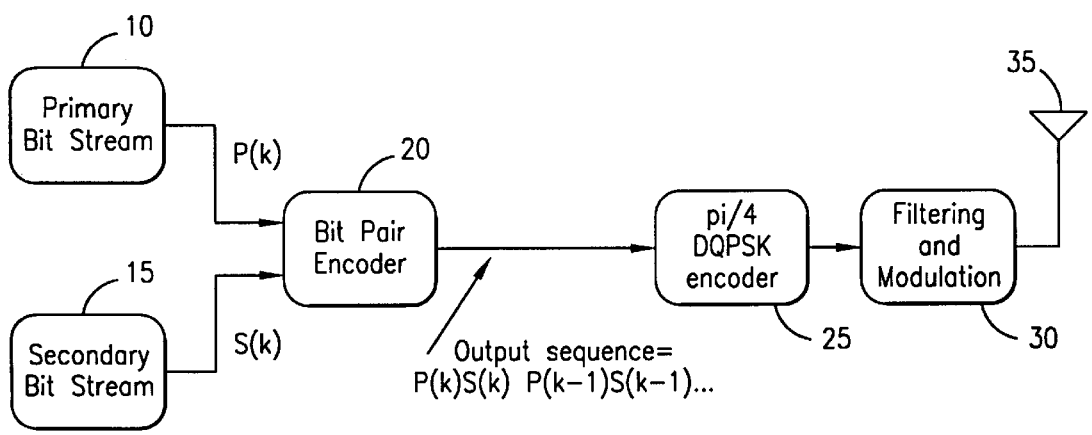
FIG. 2 is a block diagram of the modulation technique of the present invention.

Referring now to the drawings, and more particularly to FIG. 2, there is illustrated a technique for combining primary 10 and secondary 15 bit streams such that existing receiver hardware may decode and demodulate only the primary bit stream using existing FSK demodulation techniques and newer receiver hardware may decode and demodulate both the primary and secondary bit streams using a second modulation scheme providing an increased data rate. The primary bit stream 10 [P(k)] corresponds to the old FSK bits which are presently capable of being transmitted and received within existing modulation systems at a lower data rate. The secondary bit stream 15 [S(k)] represents additional bits capable of being added to a transmitted bit stream within an improved modulation scheme providing an increased data rate system.

The primary bit stream 10 and the secondary bit stream 15 are combined within a bit pair encoder 20 wherein the primary and secondary bit stream are interleaved to yield the output sequence [P(k)S(k),P(k−1)S(k−1) . . . ]. The interleaved output sequence is processed by an DQPSK encoder 25 using one of a number of DQPSK schemes, which will be more fully discussed in a moment. The DQPSK modulation schemes provide for an increased data rate that enables inclusion of the primary 10 and secondary 15 bit streams in the modulated signal where only the primary bit stream could be included in previous FSK modulation implementations. The encoded signal is processed by filtering and modulation circuitry 30 prior to transmission by an antenna 35.

Figure 3:
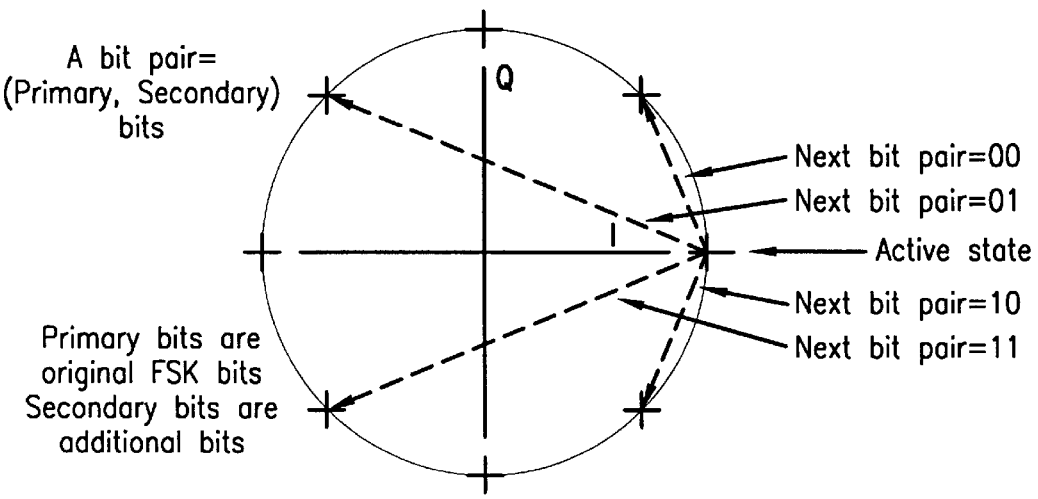
FIG. 3 is a scatter diagram of a $\pi/4$ DQPSK signal.

In a first embodiment, the DQPSK encoder 25 comprises a $\pi/4$-DQPSK di-bit encoder. When a $\pi/4$-DQPSK di-bit encoder is used, all components (encoder 25, filtering and modulation circuitry 30, bit encoder 20) illustrated in FIG. 2 are π/4-DQPSK compatible. The interlacing of bit streams which are encoded using a π/4-DQPSK encoder 25 will provide a scattering diagram as illustrated in FIG. 3. The scatter diagram illustrates that the primary bit within an interleaved bit pair will always cause a positive or negative phase transition while the secondary bit will simply define the distance (π/4 or 3π/4) of that transition. Thus, the secondary bit will cause a normal or higher than normal frequency excursion depending on its value. With this scheme phase transitions represent four different bit pair combinations, namely +π/4=0,0; +3π/4=0,1; −π/4=10; and −3π/4=1,1.

Figure 4:
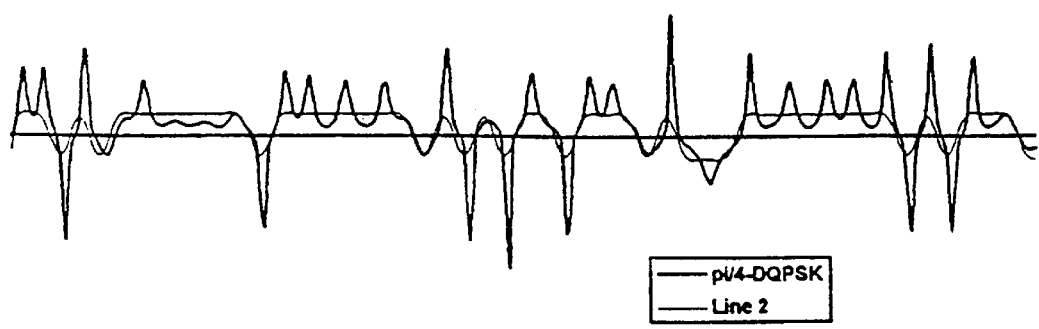
FIG. 4 is an FM demodulated comparison of a $\pi/4$ signal and an FSK signal.

A representative look at the FM demodulated signals for a π/4-DQPSK signal and an FSK signal are illustrated in FIG. 4. It can be seen that the deviation of the π/4-DQPSK modulated signal can drop below the FSK modulated signal due to the smaller π/4 transitions. This may provide an unacceptable bit-error-rate (BER) performance for existing systems even though the spectrum provided is reasonable. If a better bit-error-rate performance is required than that possible using a π/4-DQPSK encoder, the use of mπ/2-DQPSK encoder may be implemented.

Figure 5:
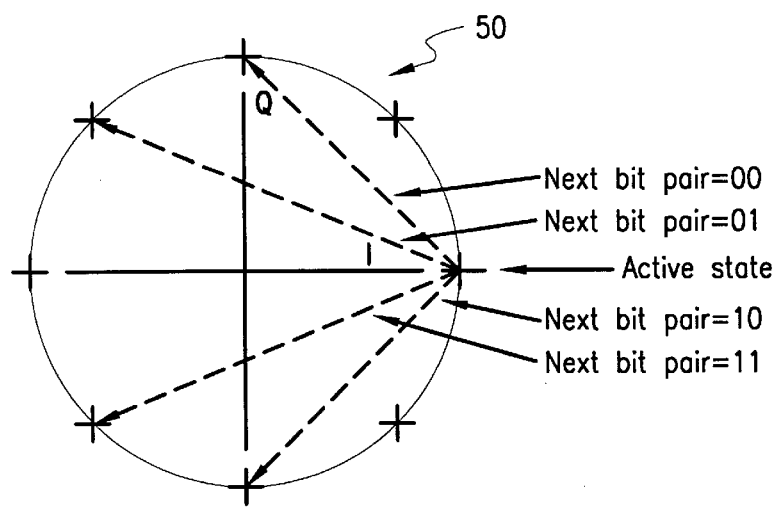
FIG. 5 is a scatter diagram of a $^m\pi/2$-DQPSK signal.
Figure 6:
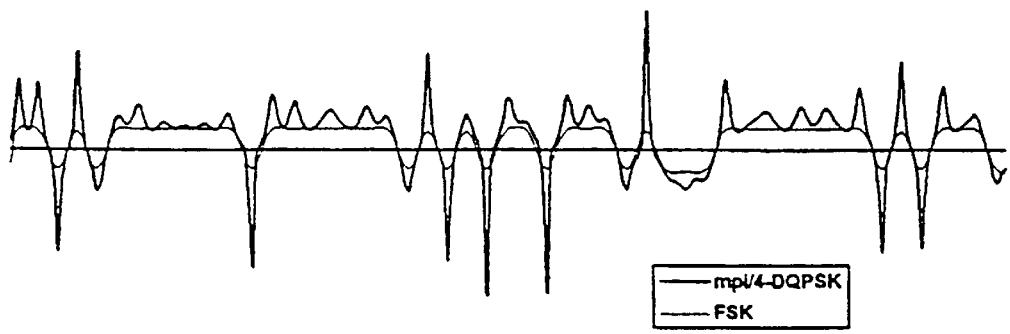
FIG. 6 is an FM demodulated comparison between an $^m\pi/2$-DQPSK signal and a 2.4 kHz deviation FSK signal.

The mπ/2-DQPSK encoder comprises a modified π/4 encoder with a π/2 minimum transition. As with the π/4 system, all components in the mπ/2 system are mπ/2 compatible. The scatter diagram for the mπ/2-DQPSK encoder is illustrated in FIG. 5. As can be seen from the scatter diagram of FIG. 4, the same number of transitions and states exist in a mπ/2 encoder as for the π/4 encoder. A transition diagram is created that is similar to that of the π/4 encoder except that there is a π/2 transition instead of a π/4 transition. Thus, there will not be short jumps around the circumference of the circle 50 as are possible in a normal π/4 encoder. The four different phase transitions again represent four different bit pair combinations namely, +π/2=0,0; 3π/4=0,1; −π/2=1,0; and −3π/4=1,1. FIG. 6 illustrates the FM demodulated signals for an mπ/2-DQPSK signal and an FSK signal.

Figure 7:
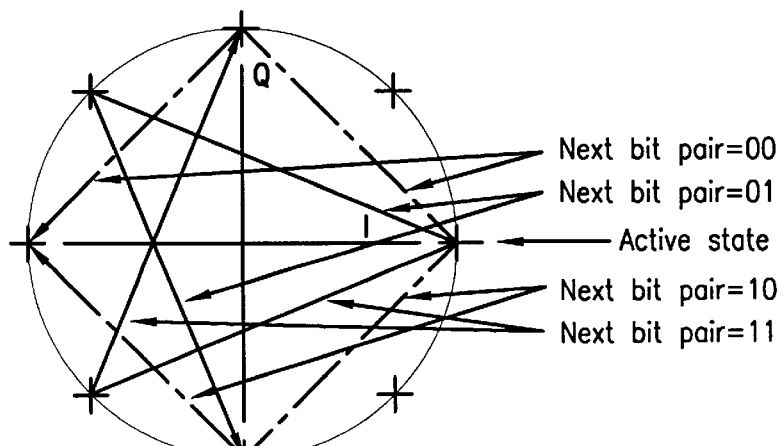
FIG. 7 is a scatter diagram for a high deviation technique.

If a higher deviation is desired, and the deviation of an mπ/2-DQPSK encoder is not sufficient, the encoding technique can be modified to include an encoder generating a scatter diagram with more than a single transition for each bit pair as illustrated in FIG. 7. The scatter diagram of FIG. 7 illustrates that by doubling the data rate and taking two transitions for the same bit pair, the FSK deviation may be increased. The only basic requirements are the primary bits maintain the same direction as before, and the secondary bits be decoded with the higher data rate. A PSK demodulator would be required to know not only the final phase after the two transitions, but the value of the first transition to determine the path taken.

Thus, both π/4-DQPSK and mπ/2-DQPSK modulated systems using the proposed encoding can provide extra bits to extend the services and range of mobile radio communication systems. The π/4 system will have a lower deviation on some of the primary bits, but equivalent bit error rate performance on the secondary bits as transition states are equally spaced relative to one another. Thus, only the primary bits in an old frequency shift key receiver would be affected. In an mπ/2-DQPSK system, the old frequency shift key receivers do not suffer any degradation with respect to the primary bits assuming the FSK deviation is equivalent to the mπ/4. The secondary bits will suffer some degradation as the transition states are closer together. However, for existing mobile radio communication systems, the secondary bits may be better error protected than the primary bits to gain back any performance losses. It should of course be realized that further state expansion (16, 32, etc.) and/or higher modulation levels (more bits) can be accomplished using the above-described technique albeit with increased performance degradation on either the primary or secondary bits or both.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for generating a modulated RF signal comprising the steps of:

interleaving a first bit stream with a second bit stream to generate a single interleaved bit stream;

encoding the single interleaved bit stream using a π/4-DQPSK encoding scheme;

modulating the encoded single interleaved bit stream using a π/4-DQPSK modulation scheme to yield a modulated, encoded single interleaved bit stream; and wherein upon demodulating and decoding the modulated, encoded single interleaved bit stream according to a first scheme yields only the first bit stream and demodulating and decoding the modulated, encoded single interleaved bit stream according to a second scheme yields both the first and second bit streams.

2. The method of claim 1 wherein the step of encoding comprises encoding the output bit stream using a plurality transitions for each bit pair.

3. The method of claim 2 wherein the step of modulating comprises modulating the encoded output bit stream using a plurality transitions for each bit pair.

4. An apparatus for increasing data rates within a modulated RF signal, comprising:

an interleaver for combining a first bit stream with a second bit stream; and an encoder for encoding a single combined bit stream from the means for combining using a π/4-DQPSK encoding scheme;

a modulator for modulating a single encoded bit stream from the encoder using a π/4 DQPSK-modulation scheme to yield a modulated, encoded single interleaved bit stream, and wherein upon demodulating and decoding the modulated, encoded single interleaved bit stream according to a first scheme yields only the first bit stream and demodulating and decoding the modulated, encoded single interleaved bit stream according to a second scheme yields both the first and second bit streams.

5. The apparatus of claim 4 further including means for modulating an encoded bit stream from the encoder such that demodulation of the encoded bit stream according to a first demodulation scheme yields the encoded first bit stream and demodulation of the encoded bit stream according to a second demodulation scheme yields both the encoded first and second bit streams.

6. The method of claim 4, wherein the encoder encodes the output bit stream using a plurality transitions for each bit pair.

7. A method for generating a modulated RF signal comprising the steps of:

interleaving a first bit stream with a second bit stream to generate a single interleaved bit stream;

encoding the single interleaved bit stream using a $m\pi/2$-DQPSK encoding scheme, where m=an integer value;

modulating the encoded single interleaved bit stream using a $m\pi/2$-DQPSK modulation scheme to yield a modulated encoded single interleaved bit stream; and wherein upon demodulating and decoding the modulated, encoded single interleaved bit stream according to a first scheme yields only the first bit stream and demodulating and decoding the modulated encoded single interleaved bit stream according to a second scheme yields both the first and second bit streams.

8. The method of claim 7 wherein the step of encoding comprises encoding the output bit stream using a plurality transitions for each bit pair.

9. The method of claim 8 wherein the step of modulating comprises modulating the encoded output bit stream using a plurality transitions for each bit pair.

10. An apparatus for increasing data rates within a modulated RF signal, comprising:

an interleaver for combining a first bit stream with a second bit stream;

an encoder for encoding a single combined bit stream from the interleaver using a $m\pi/2$-DQPSK encoding scheme, where m=an integer value;

a modulator for modulating an encoded single interleaved bit stream from the encoder using a $\pi/4$-DQPSK modulation scheme to yield a modulated encoded single interleaved bit stream; and wherein upon demodulating and decoding the modulated encoded single interleaved bit stream according to a first scheme yields only the first bit stream and demodulating and decoding the modulated, encoded single interleaved bit stream according to a second scheme yields both the first and second bit streams.

11. The method of claim 10, wherein the encoder encodes the output bit stream using a plurality transitions for each bit pair.

* * * * *